June 6, 1939.     E. LAKATOS     2,160,876
ELECTROMECHANICAL TRANSDUCER
Filed Sept. 16, 1936     3 Sheets-Sheet 1
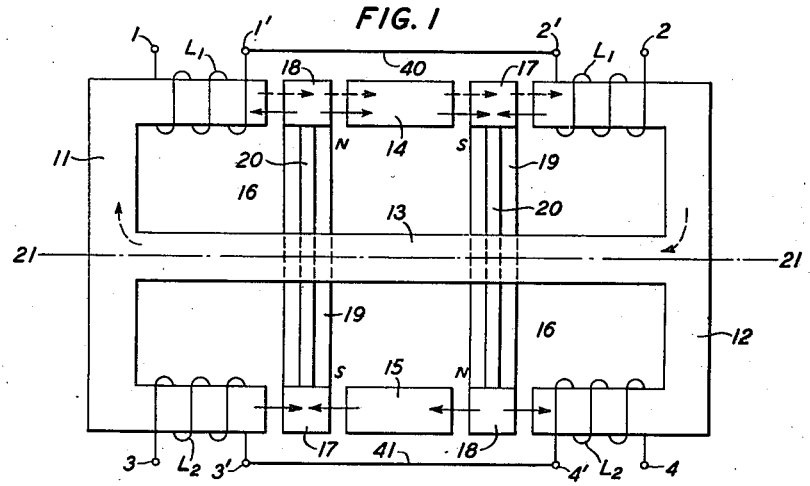
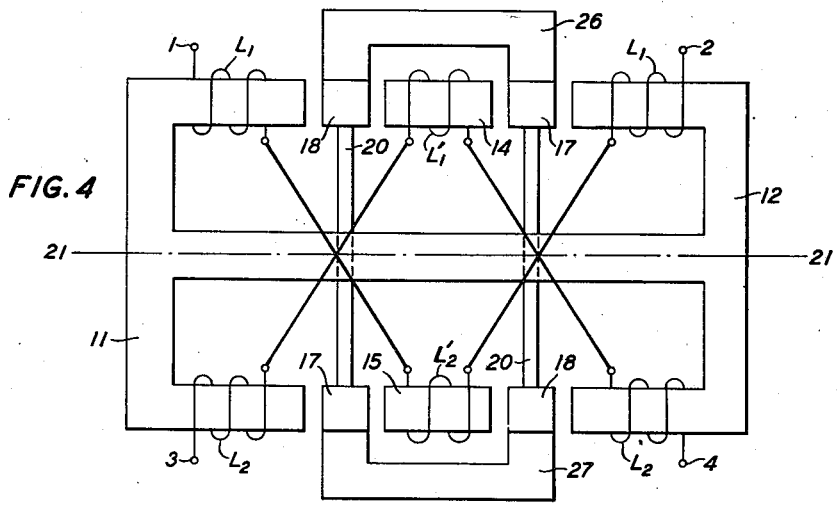
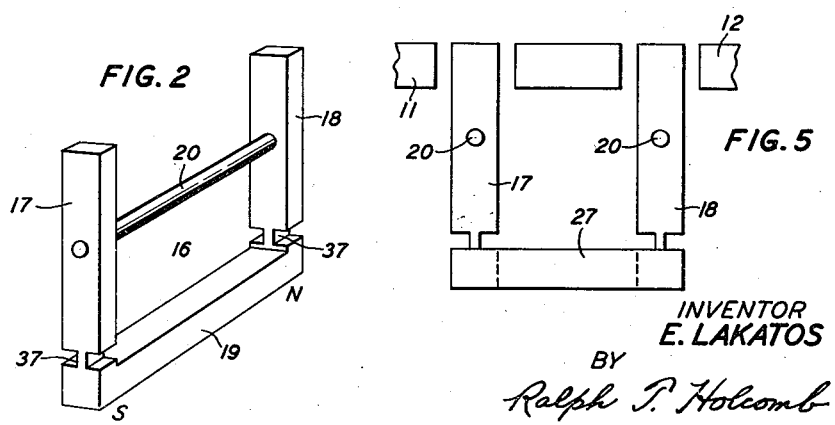
INVENTOR
E. LAKATOS
BY
Ralph T. Holcomb
ATTORNEY June 6, 1939.　　　　　E. LAKATOS　　　　　2,160,876
ELECTROMECHANICAL TRANSDUCER
Filed Sept. 16, 1936　　3 Sheets-Sheet 2

INVENTOR
E. LAKATOS
BY
Ralph T. Holcomb
ATTORNEY

June 6, 1939.  E. LAKATOS  2,160,876
ELECTROMECHANICAL TRANSDUCER
Filed Sept. 16, 1936  3 Sheets-Sheet 3
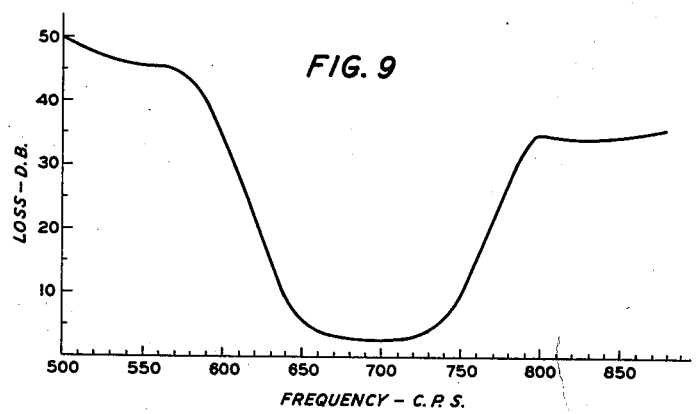
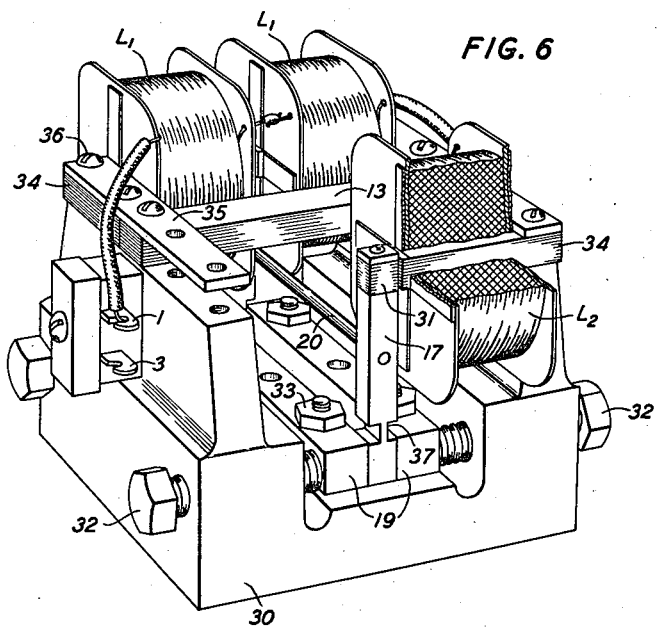
INVENTOR
E. LAKATOS
BY
Ralph P. Holcomb
ATTORNEY Patented June 6, 1939

2,160,876

UNITED STATES PATENT OFFICE 2,160,876

ELECTROMECHANICAL TRANSDUCER

Emory Lakatos, New York, N. Y., assignor to Bell Telephone Laboratories, Incorporated, New York, N. Y., a corporation of New York Application September 16, 1936, Serial No. 101,061

17 Claims. (Cl. 178—44)

This invention relates to electromechanical transducers and more particularly to transducers of this type which are suitable for use in wave filters.

An object of the invention is to increase the efficiency of conversion from electrical to mechanical energy in an electromechanical transducer.

Another object is to improve the transmission characteristics of electromechanical wave filters, especially those adapted for use in the voice frequency range.

A further object is to provide an electromechanical filter which is simpler in mechanical construction, more rugged, and less expensive to build than previously known types.

Features of the invention are the introduction of the steady flux through the vibrating armature and the provision of a closed alternating flux circuit having two parallel paths through which the direct flux flows.

Another feature is an electromechanical transducer having two vibrating armatures which move in phase opposition, thus providing a balanced mechanical structure.

Another feature is the use of electromechanical impedances in a lattice-type network.

In accordance with the invention there is provided an electromechanical transducer employing a magnetic attraction type of motor-generator mechanism comprising one or more vibrating armatures through which the direct flux is introduced and a closed alternating flux path having two parallel branches which also form a part of the direct flux path. The alternating flux is furnished by one or more input coil windings and one or more output coil windings associated with the two parallel branches. The direct flux is furnished by a permanent magnet which may also serve as the armature. When two armatures are provided, they may be connected by any suitable mechanical coupling made either of magnetic or non-magnetic material.

The transducer may be so arranged as to provide an electromechanical wave filter, and external reactance elements may be introduced in order to obtain special transmission characteristics. It is shown how the coil windings may be interconnected to form a lattice-type network. In one embodiment two or more armatures are arranged to vibrate in phase opposition, thus providing a balanced mechanical structure which reduces to a minimum the mechanical reaction on the base and allows the use of a lighter and less expensive base. In its simplest form the transducer may be used as a two-terminal impedance element in an electrical network.

The nature of the invention will be more fully understood from the following detailed description and by reference to the accompanying drawings, of which:

Fig. 1 represents diagrammatically a balanced form of an electromechanical transducer in accordance with the invention;

Fig. 2 is a perspective view of the vibratory system used in Fig. 1;

Fig. 4 shows another balanced form of the invention;

Fig. 5 is a side elevation showing how the two vibratory structures of Fig. 4 are connected by permanent magnets;

Fig. 6 is a perspective view of the preferred mechanical structure representing one embodiment of the invention;

Fig. 9 is a typical transmission loss characteristic for the network of Fig. 8.

Figure 3:
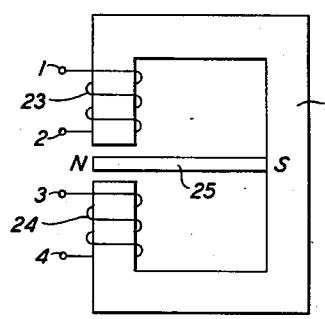
Fig. 3 represents a simple embodiment of the invention using a single vibratory element.

Fig. 1 is a diagrammatic representation of a balanced form of the electromechanical transducer of the invention. The alternating flux circuit consists of the two similar U-shaped core members 11 and 12 connected at their magnetic mid-points by the magnetic yoke 13, and the two inter-polar pieces 14 and 15 arranged to form two pairs of air-gaps. There are thus provided two parallel circuits having a common branch. In each pair of air-gaps is positioned a vibrating system 16, shown in greater detail in Fig. 2, comprising two magnetic reeds 17, 18 with web portions 37, connected at their bases by a permanent bar magnet 19 and mechanically coupled by the non-magnetic rod 20. If the bar magnet 19 has its north pole connected to the reed 18, as shown, the direct flux will flow up through the reeds 18 and at the tip will split into two components, one flowing to the right and the other to the left, as indicated in Fig. 1 by the solid line arrows. This flux will traverse the core members 11, 12 and the inter-polar pieces 14, 15 and return to the south poles of the magnets through the reeds 17, coming from two directions, as shown by the arrows.

The core carries two input coil windings $L_1$ and two output windings $L_2$. If the coils $L_1$ are connected series aiding and an alternating electromotive force is impressed upon the input terminals 1 and 2, an alternating flux will be produced which will follow the circuit indicated by the dotted line arrows. In the air-gap on one side of the upper reeds 17 and 18 the direct and alternating fluxes add while on the other side they subtract, and consequently the reeds are set into vibration. It will also be noted that the reeds will move in phase opposition, that is, when reed 17 is moving to the right, reed 18 is moving to the left, and vice versa. The vibratory system is thus mechanically balanced.

The motion of the upper reed 18 is transmitted to the lower reed 17 by means of the coupling member 20, which is in the nature of a mutual elastance and may, for example, be a non-magnetic metal rod threaded at each end. In like manner the motion of the upper reed 17 is transmitted to the lower reed 18. This motion of the two lower reeds 17 and 18 modulates the direct flux in the output circuit and thus induces an alternating electromotive force in the output coils $L_2$.

As a modification of the system shown in Fig. 1 the structure may be cut in two along the center line 21 and the bar magnets 19 terminated on the magnetic yoke 13. The lower half of the structure is then placed above the upper half. When the reeds are connected by the mechanical couplings 20, the modified structure will function in the same manner described above in connection with Fig. 1.

Figure 7:
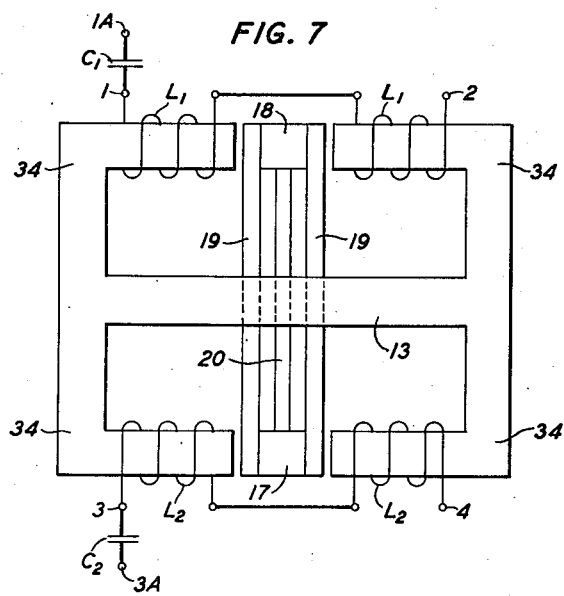
Fig. 7 is a diagrammatic representation of the structure of Fig. 6 with two external condensers added.

The balanced structure of Fig. 1 may be converted into the unbalanced form by eliminating one of the vibratory systems 16 and the inter-polar pieces 14, 15 and telescoping the resultant structure endwise. Fig. 7, described hereinafter, shows this embodiment.

By simultaneously making both of the modifications just described and using only one-half of the resultant structure, there is obtained the simplified arrangement shown in Fig. 3 consisting of a core 22 having an input coil winding 23, an output coil 24, an air-gap and a vibrator 25 with its tip positioned in the air-gap. In order to simplify the structure the vibrator itself is made a permanent magnet having north and south poles as indicated, connected at its base to the magnetic mid-point of the core. If this is done, no separate permanent magnet is required. The path of the alternating flux is around the core and across the air-gap. The direct flux leaves the vibrator at the tip, flows around the two parallel paths of equal magnetic reluctance provided by the two halves of the core and returns to the south pole. The two inner terminals 2 and 3 of the coils may be connected in the series aiding relation and the resulting structure used as a two-terminal impedance element in a variety of electrical networks.

Also, in the vibratory system 16 shown in Fig. 2 the reeds 17 and 18 may be made permanent magnets, in which case the connecting member 19 need be only a magnetic yoke.

Fig. 4 represents a transducer similar to the one shown in Fig. 1 except that the bar magnets 19 are replaced by two permanent magnets 26 and 27, one of which connects the two upper reeds 17, 18 and the other of which connects the lower reeds. This construction is shown diagrammatically in more detail in Fig. 5. In Fig. 4 there are also added two auxiliary windings $L_1'$ and $L_2'$, placed respectively on the inter-polar pieces 14 and 15. The windings $L_1$, $L_2'$ and $L_1$ are connected in series in such a way that the two $L_1$ windings are aiding while the $L_2'$ winding is opposing. The $L_2$, $L_1'$ and $L_2$ windings are connected in a similar way. This arrangement permits the adjustment or neutralization of the effects of the flux leakage between the input and the output circuits. Terminals 1 and 2 may be considered the input terminals and terminals 3 and 4 the output terminals. In the same way as described above in connection with Fig. 1, the structure shown in Fig. 4 may be cut along the center line 21, and the lower half placed above the upper half.

Fig. 6 is a perspective view of the preferred mechanical construction of the unbalanced form of the transducer of Fig. 1 described above. The device consists of a comparatively heavy bronze base 30 on which are mounted the two input coils $L_1$, the two output coils $L_2$ and the associated magnetic and vibratory structures. One of the coils $L_2$ and a section of the magnetic circuit have been removed, and a quarter section of the remaining coil $L_2$ has been broken out to show the construction more clearly. An input terminal 1 and the associated output terminal 3 are shown. The remaining input and output terminals 2 and 4 are located on the opposite side and do not appear in the figure.

The vibratory elements are the two magnetic reeds 17 and 18 coupled together by a compliance 20, shown as a non-magnetic rod threaded at each end. The tips 31 of the reeds are positioned in the air-gaps of a bridge-type magnetic circuit which carries the two pairs of coils $L_1$, $L_1$ and $L_2$, $L_2$. The reeds and the magnetic circuit are polarized by means of a pair of bar magnets 19 which also serve to clamp the reeds to the base 30. The position of the reeds is adjusted by means of the stud bolts 32. After the reeds are properly located the nuts 33 are tightened down on the clamps 19 to hold them securely to the base.

The structure has two alternating flux circuits, each comprising a pair of laminated L-shaped branches 34 on which the coils are wound, with the laminated magnetic yoke 13 common to both circuits. The core members 34 are fastened to the base 30 through oversize holes by means of the clamps 35 and the screws 36, making it possible to vary the length of the air-gaps in order to adjust the self-inductance of the coils.

The yoke 13, the members 34 and the tips 31 of the reeds are laminated. A satisfactory material for use here is an alloy consisting of 3.8% molybdenum, 78.5% nickel and 17.7% iron, formed into a sheet 0.006 inch thick and cut to shape. It is desirable to pot anneal the sheets to produce an oxide coating which serves as insulation between adjacent laminations. This type of core material has been found superior from the standpoint of stability of inductance and resistance with variations in the current or the frequency.

Cobalt steel is recomended for the bar magnets 19. The reeds 17 and 18 are made of magnetic iron. In order to increase the amount of direct flux delivered to the air-gaps per unit weight of material, the reeds may be permanent magnets, made of cobalt steel. If this is done, the cobalt steel bar magnets 19 can be replaced by cheaper chrome steel magnets, or merely by a soft iron return path.

When the reeds 17, 18 are made of soft iron, the bending strains imposed by an input load of the order of 25 milliwatts are within the allowable limit. For higher inputs it is desirable to change the material to cobalt steel or cobalt iron, for which the strain limits are higher than for soft iron. For a group of wave filters, such as are described hereinafter, all having the same band width but having different midband frequencies, the only essential difference in the mechanical vibrating system is in the thickness of the web 37 in the reeds and in the location of the coupling elastance 20.

With the construction described above, the mutual inductance between the input coils $L_1$ and the output coils $L_2$ is very small and can be held to 0.1% or less. This coupling is small because the input and the output magnetic circuits have a low reluctance common return path through the yoke 13. If this coupling is undesired, it may be canceled, or a controllable amount of mutual inductance may be introduced, by winding a small number of turns over the coils $L_1$ and $L_2$. The auxiliary winding on $L_1$ is then cross-connected to the coil $L_2$, and the auxiliary winding on $L_2$ is cross-connected to the coil $L_1$, and by proper poling the mutual inductance may be made either positive or negative. When a balanced construction is employed, as shown in Figs. 1 and 4, these auxiliary windings may be placed on the interpolar pieces 14 and 15, as described above.

Figure 8:
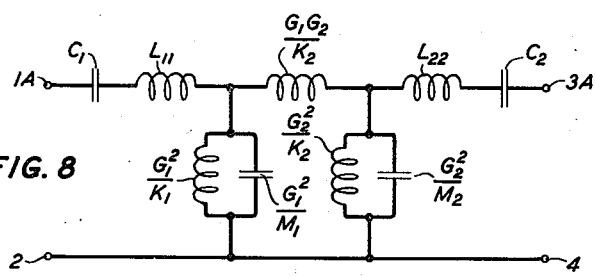
Fig. 8 is the equivalent electrical circuit for the structure of Fig. 7.

The structure shown in Fig. 6 can be designed as a band-pass filter by the addition of two external condensers $C_1$ and $C_2$ connected in series, respectively, with terminals 1 and 3 as indicated diagrammatically in Fig. 7. The equivalent electrical circuit is shown in Fig. 8, in which the values of the various elements are indicated. The inductance $L_{11}$ is the total self-inductance furnished by the input coils $L_1$, $L_1$ and $L_{22}$ is the total self-inductance of the two output coils $L_2$, $L_2$. The quantities $M_1$ and $M_2$ represent the effective masses respectively of the reeds 18 and 17 plus a small component contributed by the coupling elastance 20; $K_1$ and $K_2$ are the stiffnesses of the reeds 18 and 17, respectively; $K_{12}$ is the stiffness of the coupling 20; and the force factors at the input and output ends are, respectively, $G_1$ and $G_2$. A typical measured attenuation characteristic for the filter of Fig. 8 is shown in Fig. 9.

Figure 10:
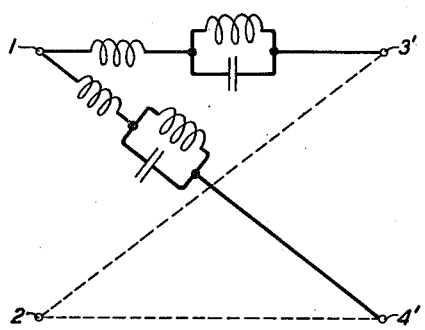
Fig. 10 shows the equivalent electrical circuit for the structures of Figs. 1 and 4 when the coil windings are connected to form a lattice-type network.

The arrangement shown in Figs. 1 and 4 and the unbalanced structures derived therefrom which employ four windings may be formed into a lattice-type network which has useful transmission properties. To do this, referring to Fig. 1, the mechanical coupling 20 between input and output is eliminated and the straps 40 and 41 are removed. The four coils $L_1$, $L_1$, $L_2$, $L_2$ are then connected in the form of a lattice by connecting terminal 4 to terminal 1, terminal 1' to terminal 3', terminal 3 to terminal 2 and terminal 2' to terminal 4'. The approximate equivalent electrical network will then be as shown in Fig. 10, in which 1 and 2 are the input terminals and 3' and 4' are the output terminals. The dotted line between terminals 2 and 3' indicates an impedance branch similar to the one connected between terminals 1 and 4', and the dotted line interconnecting terminals 2 and 4' represents an impedance equal to the one between terminals 1 and 3'. External condensers may be added if required and the network may be designed to have a band-pass transmission characteristic.

What is claimed is:

1. An electromechanical wave filter comprising two similar magnetic core sections arranged to provide a plurality of air-gaps, an input winding and an output winding disposed on said core sections, a plurality of mechanical vibratory elements fixed at their bases and having their tips positioned respectively in said air-gaps, a source of direct magnetomotive force for polarizing said vibratory elements oppositely in pairs, and a path of low magnetic reluctance interconnecting the magnetic mid-points of said two core sections whereby waves falling within a band of frequencies impressed upon said input winding are freely transmitted to said output winding while waves falling outside of said band are effectively suppressed.

2. An electromechanical wave filter in accordance with claim 1 in which two of said vibratory elements are mechanically coupled at points lying between their bases and their tips.

3. An electromechanical wave filter in accordance with claim 1 in which said source of direct magnetomotive force is a permanent magnet connecting two of said vibratory elements.

4. A mechanically balanced electromechanical wave filter comprising a magnetic core having four air-gaps, an input winding and an output winding disposed upon said core, and four armatures fixed at their bases and having their tips positioned respectively in said air-gaps, the tips of said armatures being oppositely polarized in pairs, whereby the two armatures forming one pair vibrate in phase opposition and the two armatures forming the second pair vibrate in phase opposition, and said filter being adapted to transmit freely from said input winding to said output winding a band of frequencies while attenuating frequencies lying outside of said band.

5. An electromechanical transducer comprising two similar magnetic core sections having two oppositely disposed air-gaps, a plurality of coil windings associated with said core sections, two oppositely polarized armatures fixed at their bases and having their tips positioned respectively in said air-gaps, and a magnetic path of low reluctance connecting the magnetic mid-points of said two core sections, two of said coil windings being connected series aiding to form the input circuit, and two other of said windings being connected series aiding to provide the output circuit.

6. An electromechanical transducer in accordance with claim 5 in which said two armatures are mechanically coupled.

7. An electromechanical transducer in accordance with claim 5 in which the magnetomotive force for polarizing said armatures is provided by a permanent magnet connecting said armatures.

8. An electromechanical transducer comprising two alternating flux circuits having a common branch, a plurality of air-gaps in said circuits, a plurality of polarized armatures positioned respectively in said air-gaps, and a plurality of coil windings associated with each of said circuits, a coil winding associated with one of said circuits being cross-connected with a coil winding associated with the other of said circuits in order to control the mutual inductance effective between said two groups of coil windings.

9. An electromechanical wave filter comprising two similar magnetic core sections arranged to provide a plurality of air-gaps, a plurality of coil windings associated with each of said core sections, a pair of oppositely polarized mechanical vibratory elements fixed at their bases and having their tips positioned respectively in said air-gaps, a magnetic path of low reluctance interconnecting the magnetic mid-points of said two core sections, and a plurality of external electrical reactance elements associated with said coil windings, two of said coil windings being connected series aiding to form the input circuit, and two other of said windings being connected series aiding to provide the output circuit, and said filter being adapted to transmit freely from said input circuit to said output circuit a band of frequencies while effectively suppressing frequencies lying outside of said band.

10. An electromechanical wave filter in accordance with claim 9 in which said external reactance elements are condensers.

11. An electromechanical wave filter in accordance with claim 9 in which two of said mechanical vibratory elements are mechanically coupled.

12. An electromechanical transducer comprising two similar magnetic core sections having two oppositely disposed air-gaps, a plurality of coil windings associated with said core sections, two oppositely polarized armatures fixed at their bases and having their tips positioned respectively in said air-gaps, and a magnetic path of low reluctance connecting the magnetic mid-points of said two core sections, four of said coil windings being interconnected to form a lattice-type network.

13. An electromechanical wave filter comprising a magnetic core of low reluctance to alternating flux having an input flux path and an output flux path coupled by a common branch, an input winding and an output winding associated respectively with each of said flux paths, means for introducing direct flux into each of said paths, and a tuned mechanical vibratory system for varying the magnitude of said direct flux in said output path, said vibratory system being operable by the introduction of alternating currents into said input winding, whereby energy falling within a desired band of frequencies will be freely transmitted from said input winding to said output winding but frequencies lying outside of said band will be effectively suppressed.

14. An electromechanical wave filter for freely transmitting a band of frequencies while attenuating frequencies falling outside of said band comprising an input flux path and an output flux path having a common branch, means for introducing direct flux into each of said flux paths, an input winding and an output winding associated respectively with said paths and a tuned mechanical vibratory system electromagnetically coupled to each of said paths whereby an alternating current falling within said band of frequencies introduced into said input winding produces in said vibratory system mechanical vibrations which cause variations in the magnitude of the direct flux in said output path and thereby induce corresponding alternating currents in said output winding.

15. A wave filter in accordance with claim 14 in which said input flux path and said output flux path have substantially equal magnetic reluctances.

16. An electromechanical wave filter for freely transmitting a band of frequencies while attenuating frequencies falling outside of said band comprising an input flux path and an output flux path having a common branch, an input winding and an output winding associated respectively with said paths, a tuned mechanical vibratory system including a magnetic armature fixed at its base and adapted for lateral vibration, electromagnetic coupling between said mechanical vibratory system and each of said paths, a source of direct flux and means including said armature for introducing said direct flux into each of said paths whereby an alternating current falling within said band of frequencies introduced into said input winding produces in said vibratory system mechanical vibrations which cause variations in the magnitude of the direct flux in said output path and thereby induces corresponding alternating currents in said output winding.

17. An electromechanical transducer in accordance with claim 8 in which said cross-connected coil windings are connected in series opposing relationship.

EMORY LAKATOS.